(12) United States Patent
Scott et al.

(10) Patent No.: US 7,151,827 B2
(45) Date of Patent: Dec. 19, 2006

(54) SYSTEMS, METHODS, AND DEVICES FOR AN ENHANCED ON-HOLD INTERFACE

(75) Inventors: David Scott, Norcross, GA (US);
Xiaofeng Gao, Alpharetta, GA (US)

(73) Assignee: BellSouth Intellectual Property Corporat, Wilmington, DE (US)

( * ) Notice: Subject to any disclaimer, the term of this patent is extended or adjusted under 35 U.S.C. 154(b) by 349 days.

(21) Appl. No.: 10/370,643

(22) Filed: Feb. 20, 2003

(65) Prior Publication Data

US 2004/0165715 A1    Aug. 26, 2004

(51) Int. Cl.
*H04M 3/00*   (2006.01)
*H04M 5/00*   (2006.01)

(52) U.S. Cl. .............................. 379/265.02; 379/265.09

(58) Field of Classification Search ...............................
379/265.01–265.14, 266.01–266.1, 201.01,
379/201.1, 215.01, 212.01, 257, 309, 211.02
See application file for complete search history.

(56) References Cited

U.S. PATENT DOCUMENTS

| | | | |
|---|---|---|---|
| 4,166,929 | A | 9/1979 | Sheinbein |
| 4,582,956 | A | 4/1986 | Doughty |
| 4,959,855 | A | 9/1990 | Daudelin |
| 5,155,761 | A | 10/1992 | Hammond |
| 5,438,568 | A | 8/1995 | Weisser, Jr. |
| 5,511,111 | A | 4/1996 | Serbetcioglu et al. |
| 5,572,583 | A | 11/1996 | Wheeler, Jr. et al. |
| 5,898,917 | A | 4/1999 | Batni et al. |
| 5,943,409 | A | 8/1999 | Malik |
| 5,991,364 | A | 11/1999 | McAllister et al. |
| 6,035,031 | A | 3/2000 | Silverman |
| 6,104,786 | A | 8/2000 | Gibilisco et al. |
| 6,178,240 | B1 | 1/2001 | Walker et al. |
| 6,212,268 | B1 | 4/2001 | Nielsen |
| 6,400,804 | B1* | 6/2002 | Bilder ........................ 379/76 |
| 6,408,062 | B1 | 6/2002 | Cave |
| 6,477,374 | B1 | 11/2002 | Shaffer et al. |
| 6,658,106 | B1 | 12/2003 | Atkinson et al. |
| 2001/0012335 | A1* | 8/2001 | Kaufman et al. |
| 2002/0145973 | A1* | 10/2002 | Shah et al. |
| 2002/0146106 | A1* | 10/2002 | Himmel et al. |
| 2003/0031309 | A1* | 2/2003 | Rupe et al. |
| 2003/0081752 | A1 | 5/2003 | Trandal et al. |
| 2003/0161464 | A1* | 8/2003 | Rodriguez et al. |
| 2004/0062383 | A1* | 4/2004 | Sylvain |

OTHER PUBLICATIONS

U.S. Appl. No. 10/207,586 filed Jul. 29, 2002.
U.S. Appl. No. 10/211,210 filed Aug. 2, 2002.
U.S. Appl. No. 10/255,888 filed Sep. 26, 2002.

* cited by examiner

*Primary Examiner*—William J. Deane, Jr.
(74) *Attorney, Agent, or Firm*—Lee & Hayes, PLLC

(57) ABSTRACT

An on-hold interface system is disclosed. According to one embodiment, the system includes an interactive voice response system for providing a plurality of audio signals to a telecommunications device of a calling party, wherein the calling party has been placed on-hold. The system also includes a server for checking accessibility of a network connection of a network device, wherein the network device is associated with the telecommunications device of the calling party. The system also includes an enhanced on-hold interface system for providing a plurality of signals to the network device. In addition, the system includes an automatic call distributor for receiving a signal indicating the accessibility of the network connection of the network device, and for instructing the enhanced on-hold interface system and the interactive voice response system to provide the plurality of signals to the network device and the telecommunications device based the accessibility of the network connection.

42 Claims, 10 Drawing Sheets

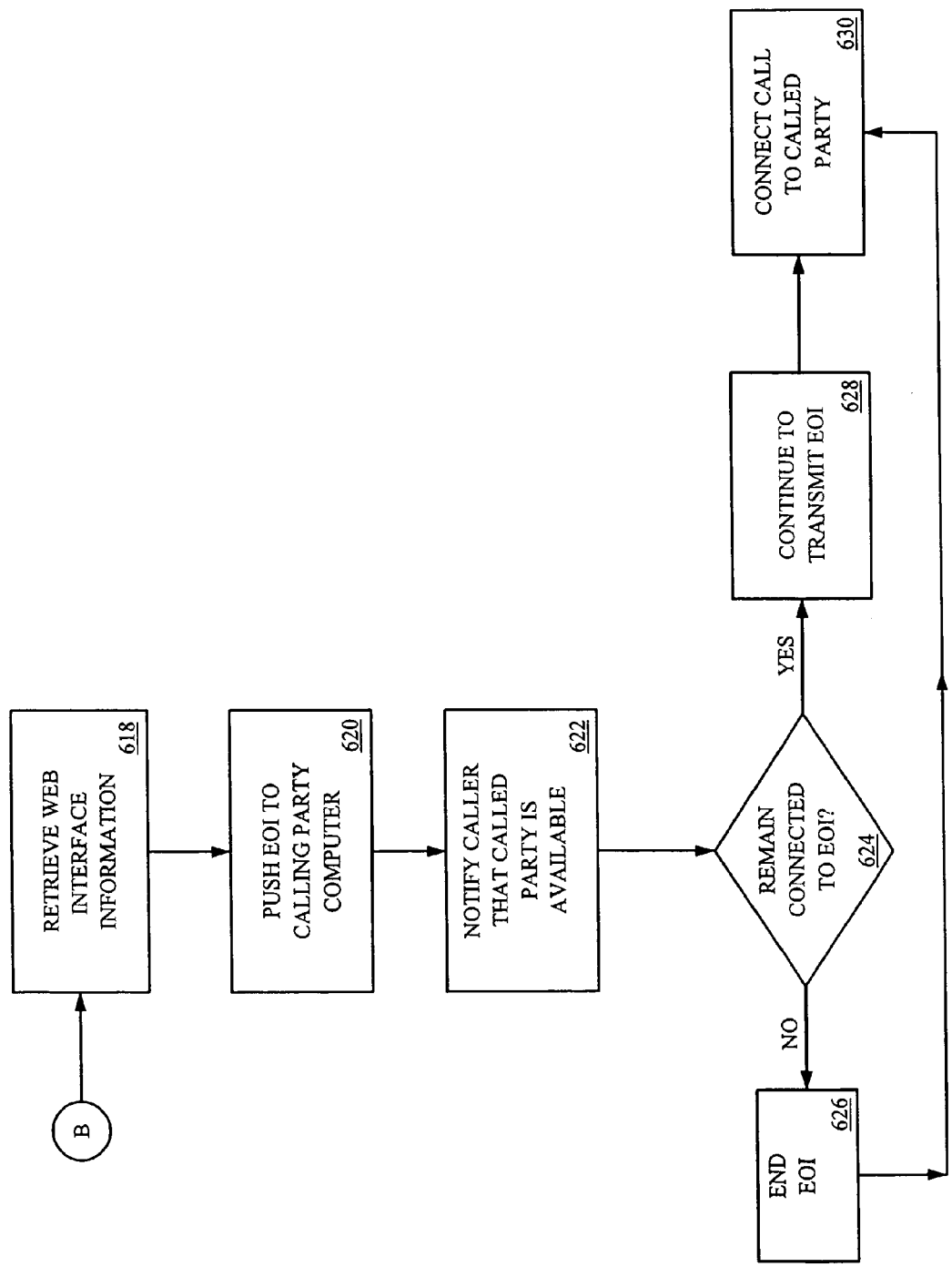

SYSTEMS, METHODS, AND DEVICES FOR AN ENHANCED ON-HOLD INTERFACE

BACKGROUND

With the advent of call-handling telephone systems, telephone-based customer service has become pervasive in modern society, especially in business concerns that require direct communication with customers. Many call-handing telephone systems include a call center that has an interactive voice response unit (IVRU), an automatic call distributor (ACD), and a number of live attendants.

Once the IVRU has determined the nature of a call, the ACD automatically identifies and distributes the call to an available attendant, or, when no customer service attendant is available, the ACD places the call in a holding queue (i.e., places the call or caller on-hold). Traditionally, when a call is placed on-hold, the call center may attempt to keep the caller's interest by delivering pre-recorded music and/or greeting messages that identify the next available attendant.

SUMMARY

In one embodiment, the present invention is directed to an on-hold interface system. The system includes an interactive voice response system for providing a plurality of audio signals to a telecommunications device of a calling party, wherein the calling party has been placed on-hold. The system also includes a server for checking accessibility of a network connection of a network device, wherein the network device is associated with the telecommunications device of the calling party. The system also includes an enhanced on-hold interface system for providing a plurality of signals to the network device. In addition, the system includes an automatic call distributor for receiving a signal indicating the accessibility of the network connection of the network device, and for instructing the enhanced on-hold interface system and the interactive voice response system to provide the plurality of signals to the network device and the telecommunications device based the accessibility of the network connection.

BRIEF DESCRIPTION OF THE DRAWINGS

Further advantages of the present invention may be better understood by referring to the following description taken in conjunction with the accompanying drawings, in which:

FIGS. 7a, 7b, and 7c are flowcharts illustrating a process performed by the systems shown in FIGS. 5 and 6 according to one embodiment of the present invention.

DESCRIPTION

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art and because they do not facilitate a better understanding of the present invention, a discussion of such elements is not provided herein.

The term "calling party" is used herein generally to refer to the person or device that initiates a telecommunication. The calling party may also be referred to herein as "caller." In some cases, the calling party may not be a person, but may be a device such as a facsimile machine, an answering service, a modem, etc. The terms "called party" and "desired party" are used herein generally to refer to the person or device that answers or responds to the call or communication. The term "communication" is used herein to include all messages or calls that may be exchanged between a calling party and a called party, including, but not limited to, voice, data and video messages. The term "communication" is used synonymously herein with the term "call" unless a distinction is noted. The term "subscriber" is used herein to generally refer to a subscriber of the described telecommunications service.

According to one embodiment, the system of the present invention utilizes the intelligent functionality of an Advanced Intelligent Network (AIN). The AIN is a network that may be used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. In another embodiment, the AIN may be a service independent architecture designed to be programmable and controlled by software distributed in elements throughout the network. In addition, the AIN may reside in a Common Channel Signaling (CCS) network, using Signaling System 7 (SS7) protocol to request routing instruction. Before describing details of the system of the present invention, a description of the AIN is provided.

Figure 1:
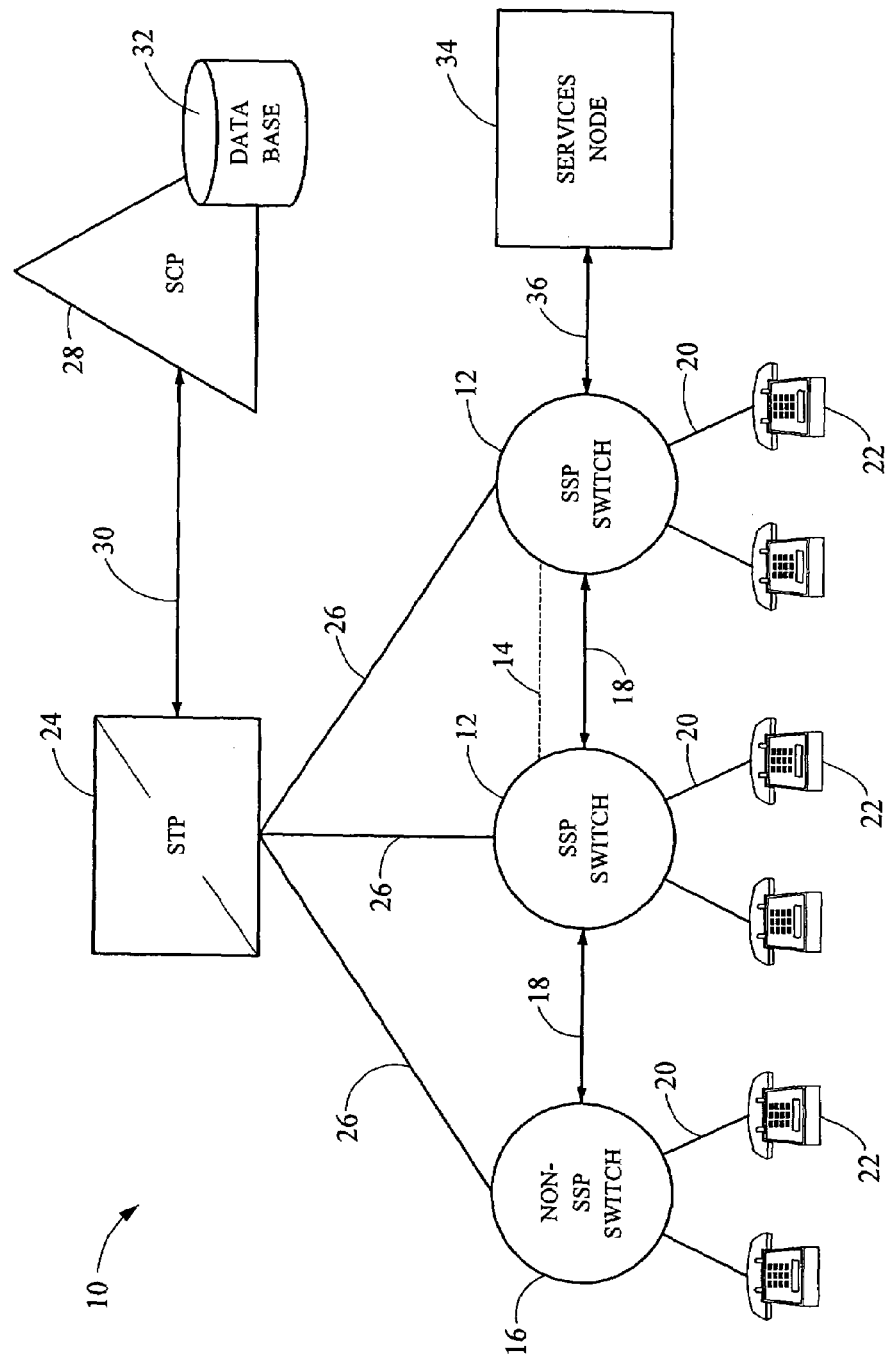
FIG. 1 is a block diagram of an Advanced Intelligent Network (AIN) for integration with a public switched telephone network according to one embodiment of the present invention.

FIG. 1 is a block diagram of an Advanced Intelligent Network (AIN) 10 for integration with the public switched telephone network (PSTN) according to one embodiment of the present invention. The AIN 10 may be employed by a Local Exchange Carrier (LEC) and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. The number of subscriber lines 20 connected to each switch 12 and switch 16 may be on the order of, for example, ten thousand to one hundred thousand lines. Each of the subscriber lines 20 is connected to a terminating piece of customer premises equipment, represented in FIG. 1 by the landline telephones 22. Alternatively, the terminating equipment may be other types of telecommunications devices such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link 26. The communication link 26 may employ, for example, the SS7 switching protocol. The STP 24 may be a multi-port high speed packet switch that is programmed to respond to the routing information in the appropriate layer of the switching protocol and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 may be employed to implement high volume routing services, such as call forwarding and number portability translation and routing. In addition, another of the functions of the SCP 28 is hosting of the network database 32, which may store subscriber information, such as subscriber call management profiles, used in providing enhanced calling services.

The AIN 10 illustrated in FIG. 1 also includes a services node (SN) 34. The SN 34 may be, for example, a Compact Services Node (CSN) available from Lucent Technologies Inc., Murray Hill, N.J., although the SN 34 may be any other type of available intelligent peripheral. The SN 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the SN 34, the return message from the SCP 28 may include instructions for the SSP switch 12 to route the call to the SN 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one SN 34, although the AIN 10 may further include an additional number of these components as well as other network components which are not included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
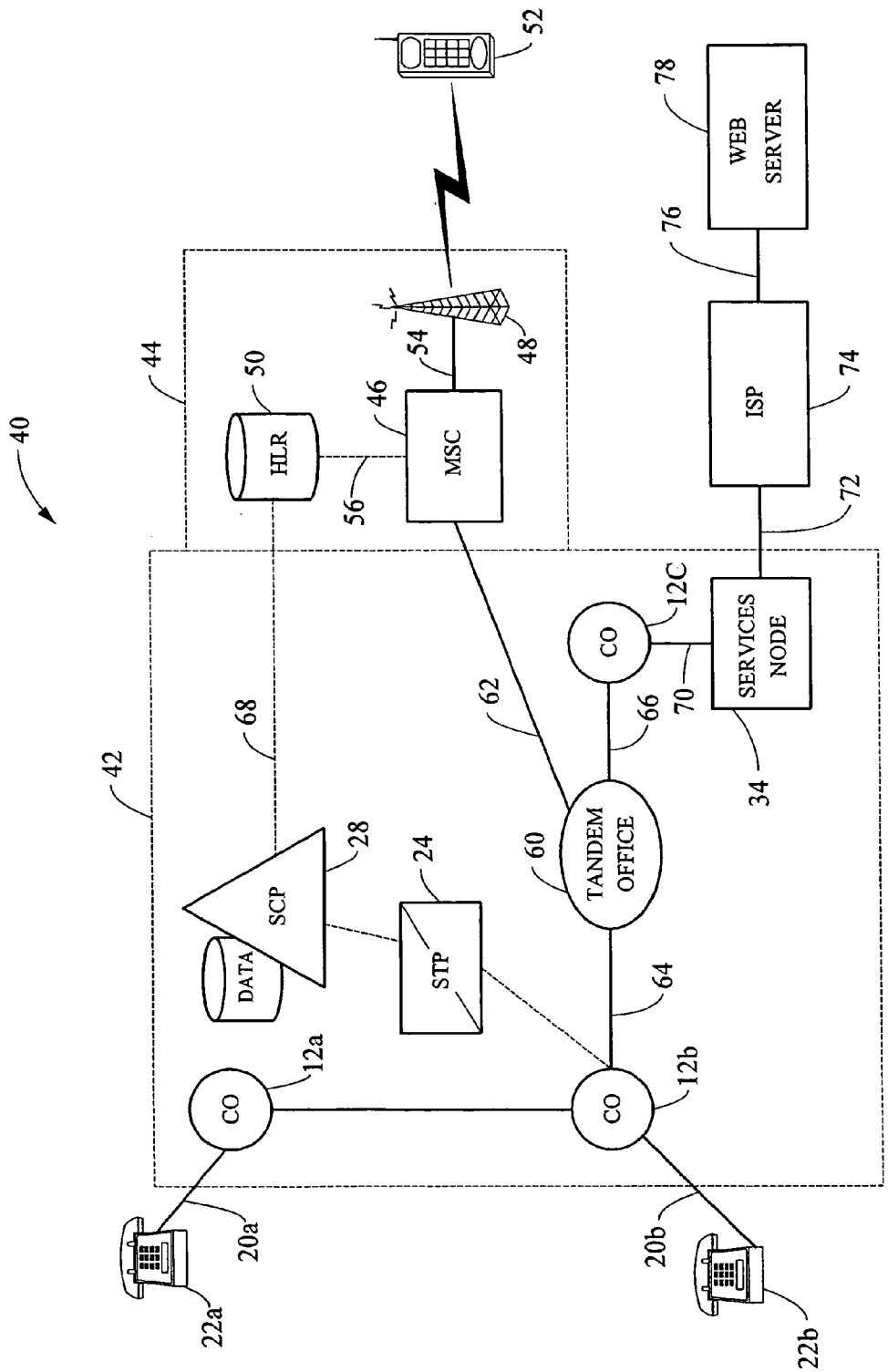
FIG. 2 is a block diagram of a system according to one embodiment of the present invention.

The present invention is directed, according to one embodiment, to a system for allowing a user of a telecommunications device, which has been placed on-hold, to receive valuable, interactive, entertainment options. FIG. 2 is a diagram of a system 40 according to one such embodiment. For clarity, the communications links, shown in FIG. 2, that are used exclusively for signaling (e.g., no call data) are illustrated with dashed lines, and communications links that transfer signaling or call data are illustrated with solid lines. The system 40 includes a landline network 42 and a wireless network 44. The landline network 42 includes portions of an AIN as described in conjunction with FIG. 1, including the CO SSP switches 12a–c (designated as "CO" in FIG. 2 and referred to as "CO switch(es)" hereinafter), the STP 24, the SCP 28, and the SN 34. The landline telephones 22a, 22b are in communication with the switches 12a, 12b via subscriber lines 20a, 20b, respectively. For purposes of clarity, other elements of an AIN are not shown in FIG. 2.

The wireless network 44 includes a mobile switching center (MSC) 46, a base transceiver station (BTS) 48, and a home location register (HLR) 50. The MSC 46 is in communication with a wireless telecommunications device 52, such as a wireless telephone, as illustrated in FIG. 2, via the BTS 48. The BTS 48 may communicate with wireless telecommunications device 52 according to an air-interface communication scheme such as, for example, AMPS (ANSI-553), TDMA (IS-136), CDMA (IS-95), or GSM. The BTS 48 maybe in communication with the MSC 46 via the communications link 54. The MSC 46 is an automatic switching system in a wireless telecommunications network that acts as the interface for subscriber traffic between the wireless network 44 and the landline network 42 or other MSCs in the same or other wireless networks. The MSC 46 performs the same general function as a central office switch in a landline based system. In addition, the MSC 46 supports incoming calls through a radio telecommunications front-end, as well as handoff and roaming functions. Accordingly, the MSC 46 may include wireless IN functionality for detecting originating and terminating triggers (e.g. WIN and CAMEL).

The MSC 46 may be in communication with the HLR 50 via a communications link 56 which may, for example, be an SS7 signaling protocol link. The HLR 50 is a location register to which the user identity of a wireless telecommunications device, such as the wireless telephone 52, is assigned for record purposes. The HLR 50 may register subscriber information relating to wireless telecommunications devices such as, for example, profile information, current location, and authorization period. When the MSC 46 detects a wireless telecommunications device entering the MSC's service area, the MSC 46 performs a registration process that includes requesting subscriber profile information from either the HLR 50 or a visitor location register (VLR) (not shown), depending upon whether the wireless telephone 52 is within its home location or within a visitor location. For integrated wireless networks, the VLR assigned to the service area of a visiting wireless subscriber may be updated with information from the HLR associated with the wireless subscriber's wireless service provider (WSP). Accordingly, the MSC 46 servicing a particular area has access to information regarding each of the wireless users presently in its service area. In addition, the HLR 50 of the wireless network 44 may be in communication with the SCP 28 of the landline network 42, via a communications link 68 employing, for example, the IS-41 signaling protocol.

The landline network 42 additionally includes a tandem office 60, which provides a switching interface between the landline network 42 and the wireless network 44. The tandem office 60 may be in communication with the MSC 46 via a communications link 62, which may be, for example, a trunk circuit or an ISDN. In addition, the tandem office 60 may be in communication with the CO switches (such as CO switches 12b, 12c as illustrated in FIG. 2) via communications links 64, 66 respectively, which may be, for example, trunk circuits.

Also, the CO switches (such as the CO switch 12c, as illustrated in FIG. 2) may be in communication with a services node (SN) 34 via a communications link 70, which may be, for example, an Integrated Service Digital Network (ISDN), including BRI (Basic Rate Interface) or PRI (Primary Rate Interface) lines. According to other embodiments, the communications link 70 may be, for example, a T-1 trunk circuit.

In one embodiment of the present invention, the SN 34 executes programmable applications to access a web server 78 to provide either the wireless device 52 or the landline device 22a, 22b with call specific information. The SN 34 then transmits such information to the wireless network 44 or the landline network 42, via the tandem office 60. In one embodiment of the present invention, the SN 34 may function as a voice/web gateway to allow the landline network 42 to access an Internet service provider 74 via a communications link 72, which may be, for example, a TCP/IP (Transmission Control Protocol/Internet Protocol) connection.

Also, the Internet service provider 74 may be in communication with a web server 78 and its corresponding database, via a communications link 76, which may be, for example, another TCP/IP connection. Furthermore, in one embodiment the SN 34 may be located in the wireless network 44.

In one embodiment, where the enhanced on-hold interface system (EOI) is provided as a subscriber service by a telecommunications provider, the SN 34 may execute programmable applications to access the web server database 78 to provide, for example, audio, video, graphics, and/or text files to entertain a caller that has been placed on-hold.

Figure 3:
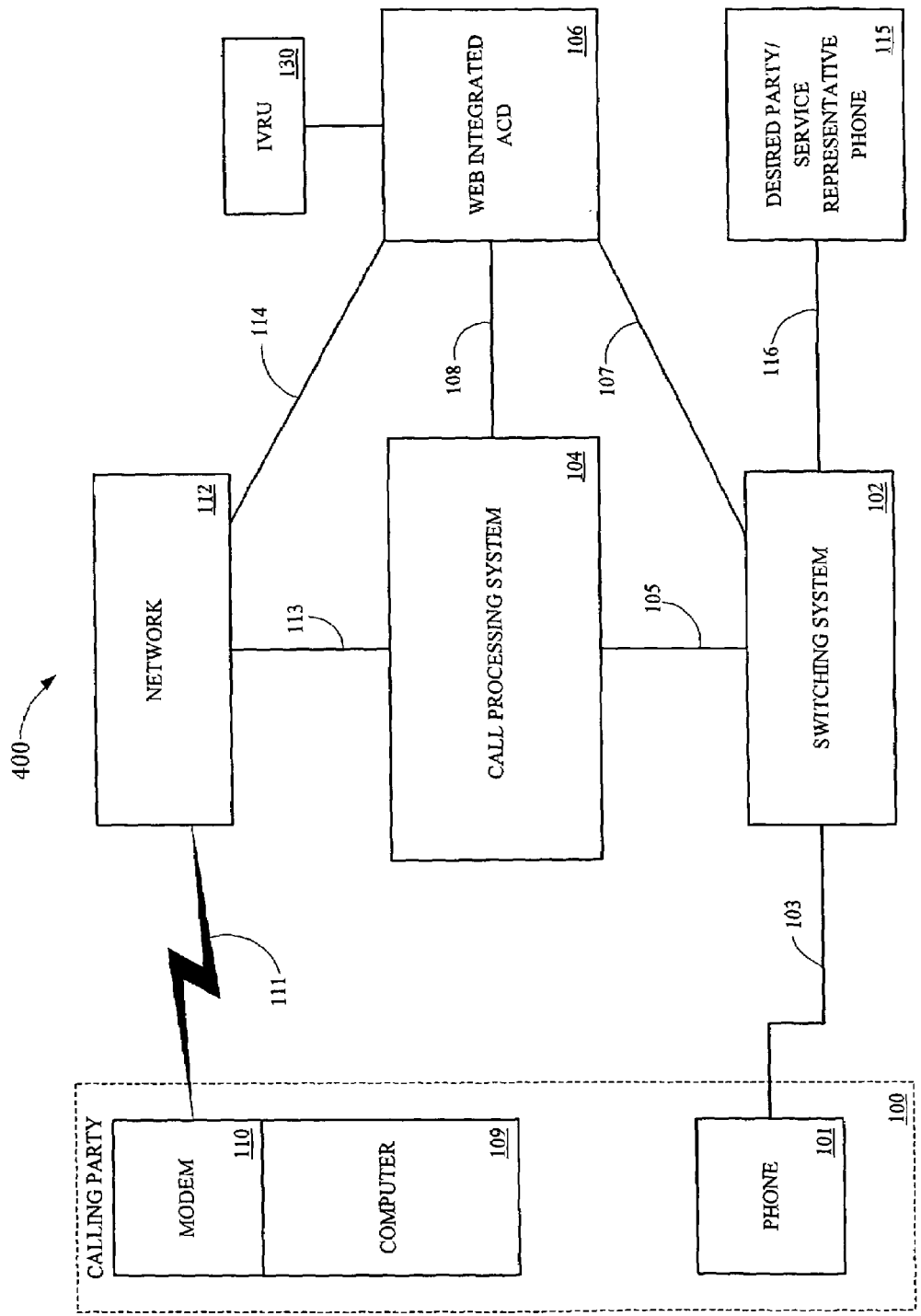
FIG. 3 is a block diagram of a system according to another embodiment of the present invention.

FIG. 3 is a block diagram of a system 400 according to one embodiment of the present invention. In one embodiment of the present invention, a calling party 100 includes a telecommunications device 101 such as, for example, a standard plain-old telephone service (POTS) telephone 101 as shown in FIG. 2. The telephone 101 operates substantially within the POTS frequency range, which contains substantially the range of frequencies which are audible to the human ear such as, for example, the frequency range of 0 to 4 kilohertz (kHz). In other embodiments, the telecommunications device may include a telecopier or a wireless telecommunications device, such as a wireless telephone, a personal digital assistant (PDA), or a pager.

The telephone 101 may be coupled to a switching system 102 via a communications link 103, which may be, for example, conventional twisted pair loop circuits or trunk circuits, such as T-1 trunk circuits. The switching system 102 is operable to connect calls between system subscribers. In order to properly route calls, the switching system 102 may be coupled to a call processing system 104 via communications link 105. The communication link 105 may employ, for example, an SS7 switching protocol. The call processing system 104 may include a customer database (not shown). The customer database may include subscriber specific handling information and call routing information. The routing information is used to connect the call to the proper party, while the subscriber specific handling information encompasses the individual services to which the calling or called parties subscribe.

In one embodiment of the present invention, one of the services may include a call center provided by the telephone service provider. A call center may include, among other things, an interactive voice response unit (IVRU), an automatic call distributor (ACD), and a number of live attendants. An IVRU 130 may query the caller and receive feedback prior to the ACD routing the call to the appropriate service representative 1115. In one embodiment of the present invention, the ACD may be a web integrated ACD 106.

The web integrated ACD 106, which may be coupled to the IVRU 130, may receive incoming calls and provide an interactive voice response service to the calling party 100 via communications link 107, which may be, for example, an Integrated Service Digital Network (ISDN), including BRI (Basic Rate Interface) or PRI (Primary Rate Interface) lines. According to other embodiments, the communications link 107 may be, for example, a T-1 trunk circuit. The web integrated ACD 106 may also send queries to the call processing system via communications link 108, which may be, for example, an Integrated Service Digital Network (ISDN), including BRI (Basic Rate Interface) or PRI (Primary Rate Interface) lines. According to other embodiments, the communications link 108 may be, for example, a T-1 trunk circuit.

According to one embodiment of the present invention, the web integrated ACD 106 may instruct the IVRU 130 to collect information from the calling party 100 prior to the calling party 100 being connected to the desired party 115. This connection may be achieved by the web integrated ACD 106 instructing the call processing system 104 to connect the call to the desired party or service representative 115 via the switching system 102 and a communications link 116. Communications link 116 may be, for example, conventional twisted pair loop circuits or trunk circuits, such as T-1 trunk circuits.

In addition, when an incoming call is received and placed on-hold, the web integrated ACD 106 may send a query to the call processing system 104 to determine if the calling party 100 has a network device such as, for example, a computer 109 having a modem 110 with an accessible connection 111 to the network 112. The network connection may also include a standard modem, a cable modem, a digital subscriber line, an ethernet connection, or any other method which provides computer connectivity to a computer network. In another embodiment of the present invention, the network device may include a personal digital assistant (PDA), a pager, or any other device capable of receiving and transmitting data between the network 112 and the user of the network device.

The call processing system 104 is coupled to the network 112 via communications link 113, which may be, for example, an Integrated Service Digital Network (ISDN), including BRI (Basic Rate Interface) or PRI (Primary Rate Interface) lines. According to other embodiments, the communications link 113 may be, for example, a T-1 trunk circuit. The call processing system 104 may include a database (not shown), which comprises a list of users (i.e. callers) with accessible network connections. In addition, the call processing system 104 may also compile the database through a registration application residing on the calling party computer 109, which may send a registration request through the network 112 to the call processing system 104, via communications link 113. In one embodiment, the registration application may be a custom application that is either manually executed by the user or automatically executed whenever the calling party computer 109 boots up. The registration application may also be, for example, an instant messaging client residing on the calling party computer 109. Common instant messaging clients includes, among others,: MSN® Messenger, available from Microsoft, Corp. of Redmond, Wash.; Yahoo® Messenger, available from Yahoo!, Inc. of Sunnyvale, Calif.; AOL Instant Messenger™, available from America Online, Inc. of Dulles, Va.; and Jabber® Instant Messenger, available from Jabber, Inc. of Denver, Colo. One skilled in the art will further recognize that the Jabber Instant Messenger comprises an open systems architecture. Open systems architectures generally allow a user to manipulate the source program to tailor the client to specific needs of each individual user. Used in this context, the open system architecture may facilitate the development of a custom application to provide a registration with a central user database. In other embodiments, each of these alternative text communication applications, among others, is intended to be included within the scope of the present invention.

According to one embodiment of the present invention, the call processing system 104 may receive a query from the web integrated ACD 106 and relay the query to the network 112. In addition, the service provider providing network access to the calling party computer 109 may include a database (not shown) that dynamically assigns network addresses to its users as they log on and log off of the network 112. In addition, the web integrated ACD 106 may have access to the applicable network database and the ability to map the calling party telephone number (or other identification) to a network address. The network service provider may also include other databases, which may correlate the caller's proper name and/or telephone number with the caller's username and ultimately to a network address if the caller has a computer 109 connected to the network 112. Thus, the call processing system 104 will be able to query the network 112 using the proper name and/or telephone number of the calling party and receive a network address in response if the calling party computer 109 is connected to the network 12. If the calling party computer 109 has an accessible network connection 111, the calling party is considered to have an active associated connection between the calling party telephone 101 and the calling party computer 109.

According to another embodiment, the web integrated ACD 106 may alternatively send a query directly to the network 112, via communications link 114, to request information about the active associated connection status of a particular calling party. Communications link 114 may be, for example, an Integrated Service Digital Network (ISDN), including BRI (Basic Rate Interface) or PRI (Primary Rate Interface) lines. According to other embodiments, the communications link 114 may be, for example, a T-1 trunk circuit.

When the web integrated ACD 106 receives a network address signifying that the on-hold calling party 100 has an active associated connection between the calling party telephone 101 and the calling party computer 109, the web integrated ACD 106 may then connect the IVRU 130 to the calling party telephone 101. The IVRU 130 may then send a pre-recorded voice message to the calling party telephone 101 indicating that there is an accessible network computer 109, and thus an enhanced on-hold interface system (EOI) is available. The EOI may transmit to the calling party computer 109 audio, video, graphics, and/or text files, for example, and thus provide the on-hold caller 100 with a variety of interactive entertainment options such as, for example, on-line games, advertisements, short films, movie trailers, etc. Music videos, relating to the music being played over the calling party telephone 101 while the calling party is on-hold, may also be transmitted to the calling party computer 109. The IVRU 130 may then offer to the calling party, via audio prompts, the option of connecting to the EOI. In addition, the web integrated ACD 106 may also instruct a web server (not shown) residing on the network 112 to deliver to the calling party computer 109 a visual prompt, such as, for example, a pop-up dialogue box that may not only notify the calling party that the EOI is available, but also may receive a user input that identifies whether or not the calling party 100 desires to connect to the EOI.

If the calling party 100 refuses to connect to the EOI or if the calling party 100 does not have an active associated connection, the web integrated ACD 106 may instruct the IVRU 130 to deliver to the calling party telephone 101 audio entertainment options such as, for example, music selections, poetry, advertisements, etc. However, if the calling party chooses to connect to the EOI, the web integrated ACD 106 may instruct the web server residing on the network 112 to deliver the EOI to the calling party computer 109. Further, the EOI delivered from the web server to the calling party computer 109 may be in addition to or in place of audio entertainment options delivered from the IVRU 130 to the calling party telephone 101.

In other embodiments of the present invention, the web integrated ACD 106 may supply the web server with the network address of the calling party computer 109, or alternatively, the web integrated ACD 106 may instruct the web server to retrieve the network address of the calling party computer 109 from the network database in order to deliver the EOI to the calling party computer 109. In one embodiment of the present invention, the web server may "push" a web page to the calling party computer 109 or send a universal resource locator (URL) to the calling party computer 109 while the call is on-hold. Pushing the web page to the calling party computer 109 may be performed, for example, by a "webcasting" application residing on the calling party computer 109. "Push" technology is currently available in a number of forms including, but not limited to: Backweb®, available from Backweb Technologies of San Jose, Calif.; Microsoft® Internet Explorer, available from Microsoft Corporation of Redmond, Wash.; Netscape® Netcaster, available from Netscape Communications Corporation of Mountain View, Calif.; Pointcast®, available from Infogate, Inc. of San Diego, Calif. Pushing a URL to the calling party computer 109 may be accomplished using any of the "push" technologies listed above, but may alternatively be accomplished by merely sending the URL to the calling party computer 109 using any of the chat clients listed previously. The URL would provide the calling party computer 109 a link to the web server. Upon selecting the link, the calling party computer 109 would send a request to the web server, initiating a "pull" connection between the web server and the calling party computer 109. The web server would respond by returning a web page corresponding to the EOI.

According to another embodiment, one of the services of the call processing system 104 may include an EOI service. In this embodiment, when a calling party places a call, the call request is received at the switching system 102. The switching system 102 queries the call processing system 104 for subscriber specific handling information. The call processing system 104 then queries a telephone service customer profile database to find the services to which the calling party subscribes.

If the calling party subscribes to an EOI service, the call processing system 104 database has a record that indicates specific handling information and call routing information. Such handling and routing information may include the call processing system 104 checking its own database or, alternatively, a network database for accessibility of a network connection 111 associated with the calling party 100. If the call processing system 104 does not find an accessible network connection 111, the call processing system 104 instructs the switching system 102 and/or the web interactive ACD 106 to connect the call to the IVRU 130, which will deliver audio entertainment options to the calling party telephone 101 such as, for example, music selections, poetry, advertisements, etc.

However, when the call processing system 104 finds an accessible network connection 111, the call processing system 104 may notify the calling party 100 that the EOI is available. The call processing system may also ask the calling party 100 if he or she would like to connect to the EOI in addition to or in place of audio entertainment options. If the calling party indicates that he or she would like to only receive audio entertainment options, the call processing system 104 instructs the switching system 102 and/or the web integrated ACD 106 to connect the calling party telephone 101 to the IVRU 130, which may deliver, for example, music selections, poetry, advertisements, etc.

However, if the calling party indicates that he or she would like to connect to the EOI, the call processing system 104 may instruct the web server to use "push" technologies to deliver a URL or a web page to the calling party computer while the call is on-hold or send the URL to the calling party computer 109 via a chat client, among other methods of initiating an interactive session with the calling party computer 109.

In another embodiment of the present invention, after finding an accessible network connection 111, the call processing system 104 may pass the calling party computer 109 network address to the web integrated ACD 106 to establish a connection between the web integrated ACD 106 and the calling party computer 109. The web integrated ACD 106 may then instruct the IVRU 130 and/or the web server to send one or more prompts to the calling party telephone 101. In one embodiment of the present invention, the calling party may, for example, receive audio prompts, which are transmitted by the IVRU 130 to the calling party telephone 101. In addition, the calling party may also receive visual prompts such as, for example, a dialogue box that is transmitted by the web server to the calling party computer 109. These prompts may, for example, first indicate that the EOI is available and then require the calling party to select or decline the EOI. If the calling party refuses to connect to the EOI, the web integrated ACD 106 may instruct the IVRU 130 to send to the calling party telephone 101 audio entertainment options such as, for example, music selections, poetry, advertisements, etc. If the calling party prefers to connect to the EOI, the web integrated ACD 106 may retrieve the calling party computer 109 network address and send it to the web server to initiate an EOI session. The web server may then, for example, initiate a session with the calling party 100 by sending a URL or pushing a web page to the calling party computer 109. In an alternative embodiment, the calling party 100 may, for example, save the URL and use the URL at a later date.

In yet another embodiment of the present invention, the web integrated IVR 106 queries either the network 112 and/or the call processing system 104 to find the accessibility of a calling party's network connection 111. According to this embodiment, the switching system 102 may receive a call request from the calling party telephone 101. The switching system 102 may, for example, query the call processing system 104 for routing instructions and, based on such instructions, connect the call to the web integrated ACD 106. The web integrated ACD 106 may then query the network database using the calling party name or telephone number to determine if the calling party computer 109 has an accessible network connection 111. If an accessible network connection 111 is present, the web integrated ACD 106 may then identify the network address of the calling party computer 109 and ultimately establish an active associated connection between the calling party telephone 101 and the calling party computer 109. The web integrated ACD 106 may then instruct the UVRU 130 and/or the web server to send one or more prompts to the calling party telephone 101. In one embodiment of the present invention, the calling party may, for example, receive audio prompts, which are transmitted by the IVRU 130 to the calling party telephone 101. In addition, the calling party may also receive visual prompts such as, for example, a dialogue box that is transmitted by the web server to the calling party computer 109. These prompts may, for example, first indicate that the EOI is available and then require the calling party to select or decline the EOI. If the calling party refuses to connect to the EOI, the web integrated ACD 106 may instruct the IVRU 130 to send to the calling party telephone 101 audio entertainment options such as, for example, music selections, poetry, advertisements, etc. If the calling party prefers to connect to the EOI, the web integrated ACD 106 may retrieve the calling party computer 109 network address and send it to the web server to initiate an EOI session by sending a URL or pushing a web page to the calling party computer 109. In an alternative embodiment, the calling party 100 may save the URL and use the URL at a later date.

According to one embodiment, once the customer service representative 115 is available to service the call, the web integrated ACD 106 may instruct the web server to deliver to the calling party computer 109 a visual message such as, for example, a pop-up dialogue box that notifies the calling party that a representative 115 is available to service the call. This visual message may be in addition to or in place of an audio message that the IVRU 130 may deliver to the calling party telephone 101, wherein the audio message also notifies the calling party 100 of the present availability of the service representative 115.

In addition to the aforementioned notification messages, the web integrated ACD 106 may instruct the IVRU 130 to transmit audio prompts to the calling party telephone 101. Likewise, the web integrated ACD 106 may also instruct the web server to deliver visual prompts to the calling party computer 109 such as, for example, a dialogue box. These prompts may be capable of receiving caller inputs that provide the calling party with the option of remaining connected to the EOI after the call is transferred from the holding queue to the desired called party 115. After receiving the calling party's response regarding use of the EOI after the call is transferred to the desired party, the web integrated ACD 106 may then connect the calling party telephone 101 to the desired called party or service representative 115 via the switching network 102.

Figure 4A:
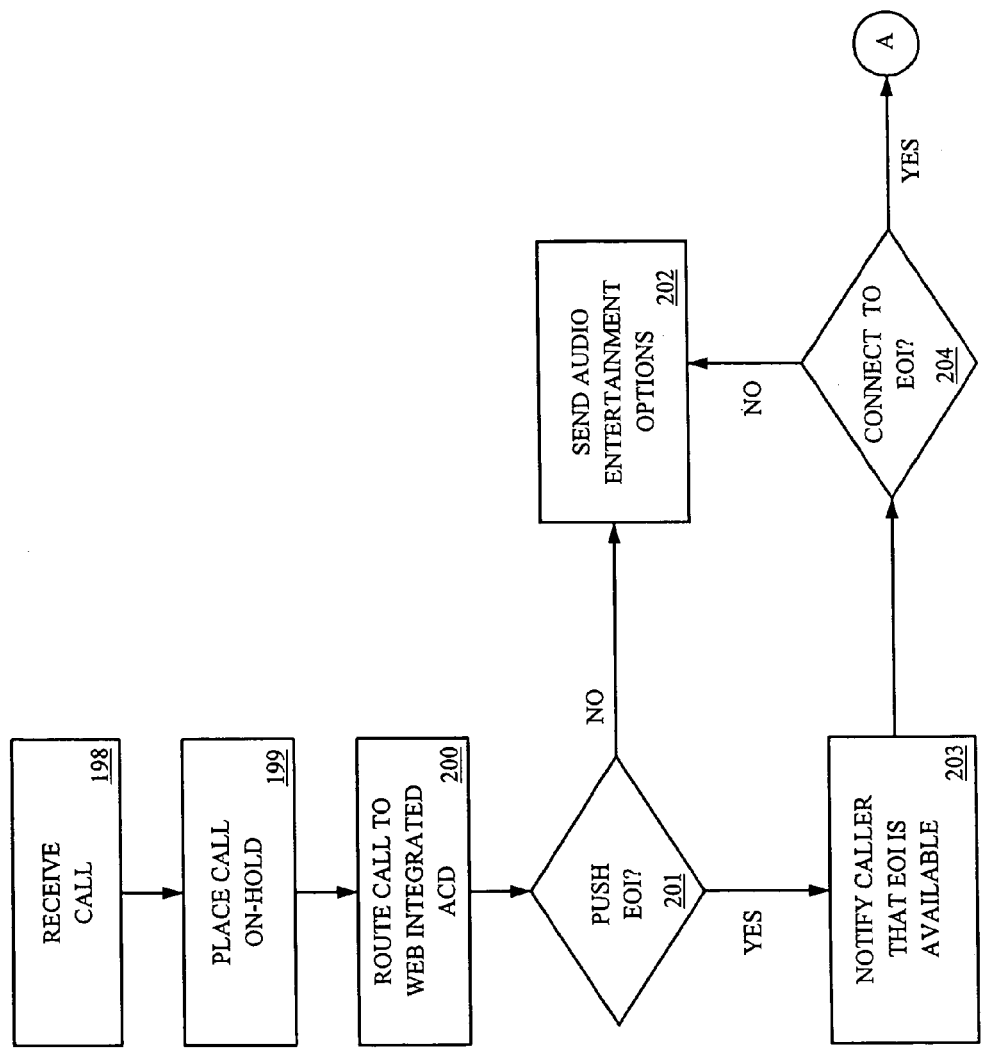
FIGS. 4a and 4b are flowcharts illustrating a process performed by the system shown in FIG. 3 according to one embodiment of the present invention.
Figure 4B:
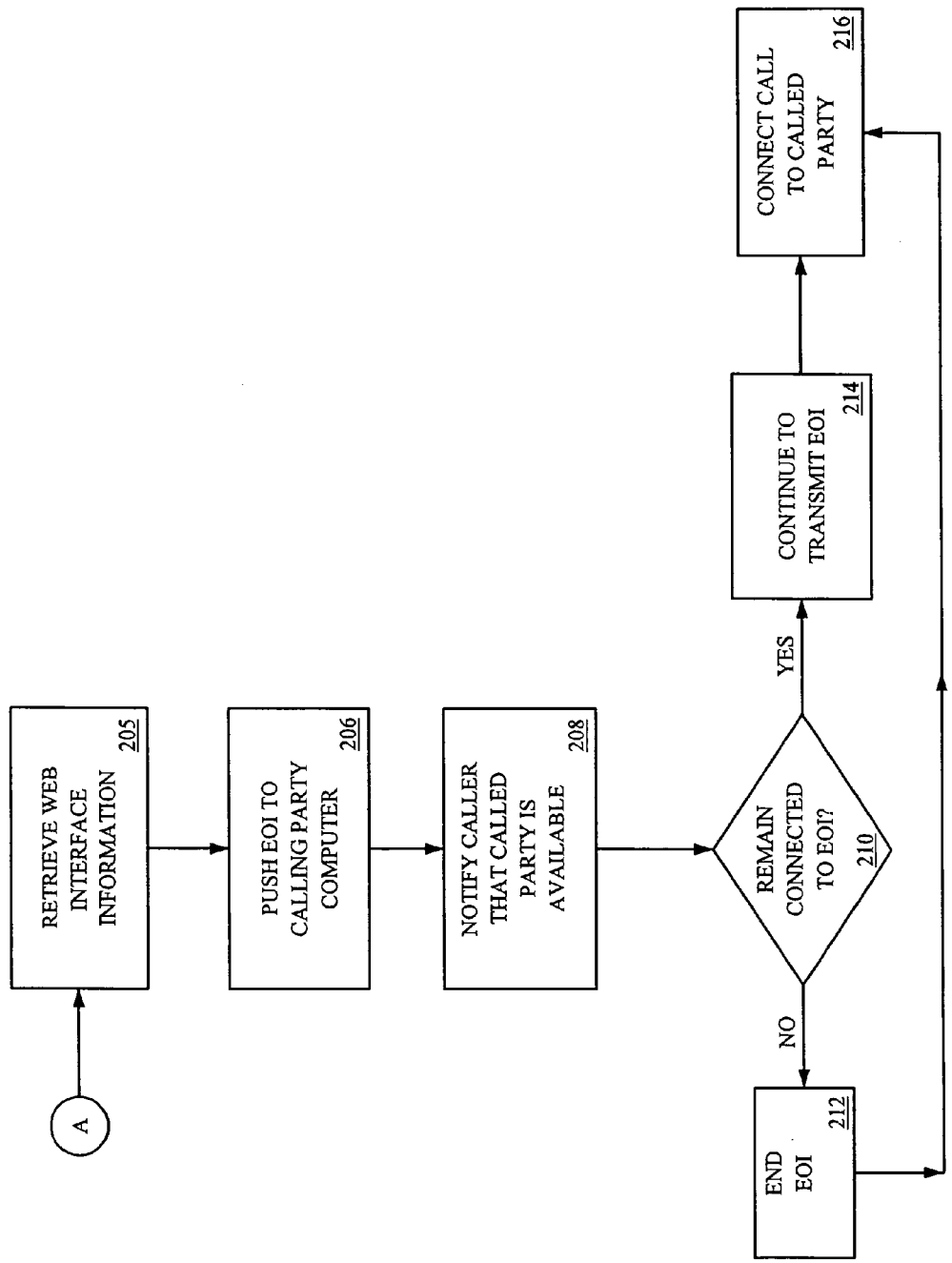

FIGS. 4a and 4b are flowcharts illustrating an embodiment of a process performed by the system shown in FIG. 3. At step 198, the calling party 100 places a call to the desired party 115 and the system receives the call. If the desired party is unavailable to receive the call, the system places the call on-hold and routes the call to the web integrated ACD 106, as shown in steps 199 and 200. At step 201, the system then determines if an EOI can be pushed to the calling party 100. The EOI can be pushed to the calling party 100 if the calling party computer 109 has an accessible network connection. The accessibility of the network connection depends upon the presence of a connection 111 and the availability of the calling party 100. If the network connection 111 is not present and/or the calling party 100 is not available, then the EOI cannot be pushed, and as shown by step 202, audio entertainment options are sent to the calling party telephone 101 such as, for example, music selections, poetry, advertisements, etc.

If a network connection 111 is accessible, the EOI can be pushed, and as shown by step 203, the system notifies the calling party that the EOI is available. The system then asks the calling party 100 if he or she would like to connect to the EOI, as shown by step 204. If the calling party refuses to connect to the EOI, the system sends audio entertainment options to the calling party telephone 101 such as, for example, music selections, poetry, advertisements, etc.

If the calling party answers affirmatively to connecting to the EOI, the system retrieves the web interface information, as shown by step 205. This information may include, for example, the network address of the calling party, a customized menu system for the specific calling party, and any other information that might be useful in facilitating interaction with the calling party. As shown by step 206, the system then pushes the EOI to the calling party computer 109.

Once the desired party 115 is available to service the call, the system then notifies the calling party 100 that the called party 115 is available, as shown by step 208. At step 210, the system then asks the calling party 100 if he or she would like to remain connected to the EOI after the call is transferred from the holding queue to the called party 115.

If the calling party 100 refuses to remain connected to the EOI, the system ends the EOI session on the calling party computer 109, as shown by step 212. However, if the calling party 100 decides to remain connected to the EOI after being transferred from the holding queue to the called party 115, the system will continue to transmit the EOI to the calling party computer 109, as shown by step 214. After receiving the calling party's responses concerning the EOI, the system may then connect the call to the desired called party or service representative 115 at step 216.

Figure 5:
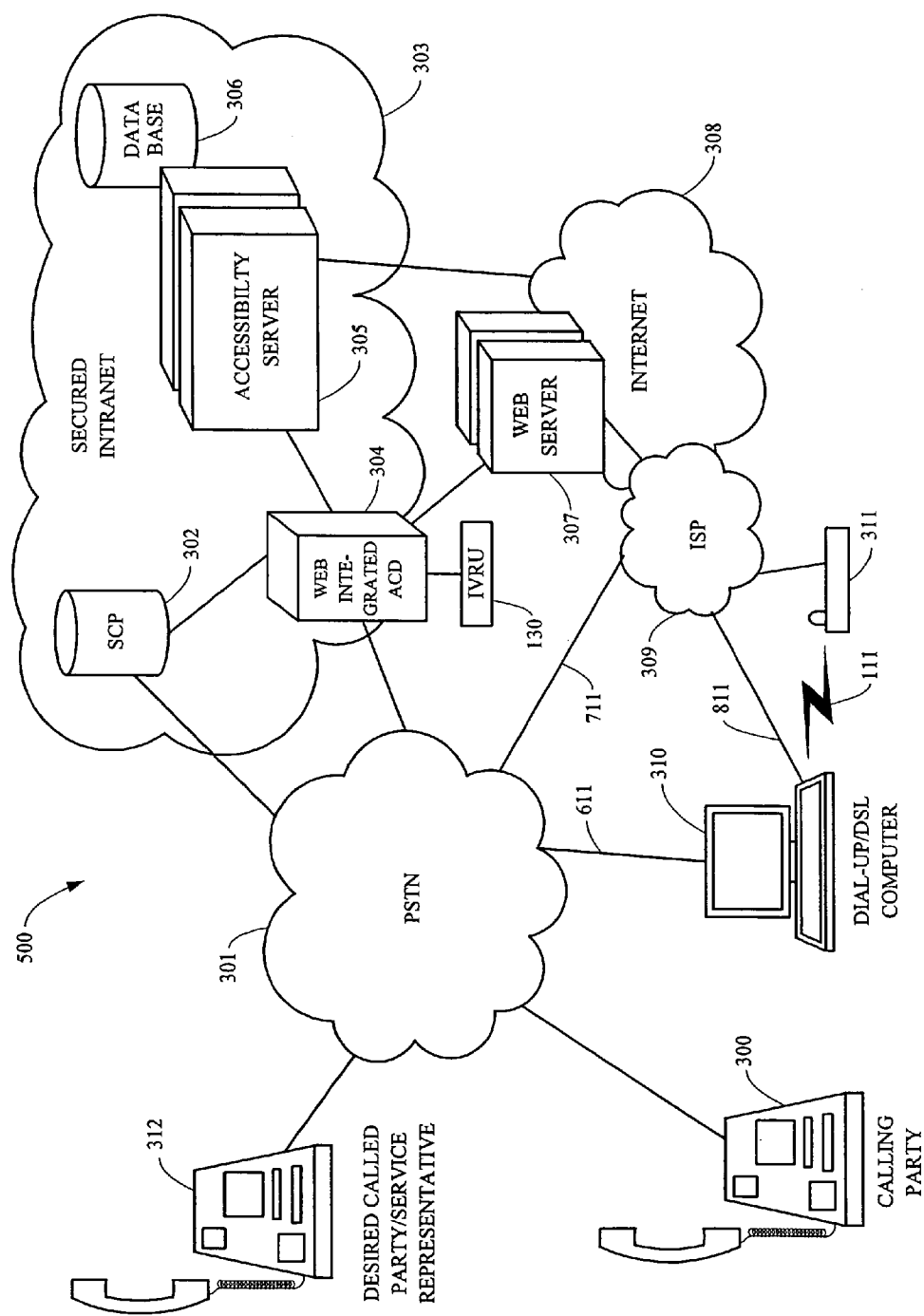
FIG. 5 is a block diagram of a system according to another embodiment of the present invention.

FIG. 5 is a block diagram of a system 500 according to another embodiment of the present invention. According to this embodiment, a calling party telephone 300 may be coupled to a public switched telephone network (PSTN) 301, which includes a plurality of service switching points (SSPs) (not shown). The PSTN receives call handling information from a service control point (SCP) 302. The SCP 302 may reside, for example, on a secured intranet 303, which may also include an accessibility server 305, an accessibility database 306, and a web integrated ACD 304. In alternative embodiments, the web integrated ACD 304, accessibility server 305, and accessibility database 306 may exist on a separate intranet, among other possible arrangements. The web integrated ACD 304 is coupled to a web server 307, which may reside on the Internet 308. The Internet 308 further includes an overlaid Internet service provider (ISP) 309. The ISP 309 includes a connection to a plurality of network devices such as, for example, computers and provides these network devices with a connection to the Internet 308. Although FIG. 5 shows the network device 310 as a computer, in another embodiment of the present invention, the network device may also include a personal digital assistant (PDA), a pager, or any other device capable of receiving and transmitting data between the Internet 308 and the user of the network device.

The computer 310 is intended to show a variety of methods by which the calling party can use a computer to connect to the Internet 308, each of which, among others, can be used in conjunction with the present invention. The computer 310 may be, for example, a standard dial-up or DSL appliance. According to one embodiment, the computer 310 may be connected to the ISP 309 through the PSTN 301, via connections 611 and 711. According to another embodiment, the computer 310 may have a direct connection 811 to the ISP 309, without the PSTN 301. With respect to the telephone service providers, connections 611, 711, and 811 may, for example, represent a cable modem or ethernet in one embodiment of the present invention. In yet another embodiment, the computer 310 may have a wireless system connection, whereby the computer 310 has an accessible connection 111 via radio frequency (RF) to a base station 311. The base station 311 in turn may be connected directly to the Internet 308 or to the ISP 309, as shown in FIG. 5.

In one embodiment of the present invention, the telephone service provider may, for example, function as a call center for the called party 312. According to this embodiment, the web integrated ACD 304 may reside on the secured intranet 303. When the PSTN 301 receives a call for the called party 312, it queries the SCP 302 for subscriber specific handling instructions. The SCP 302 responds by instructing the PSTN 301 to connect the call to the web integrated ACD 304. The web integrated ACD 304 may then send a query to the accessibility server 305 to determine whether there is an accessible Internet connection associated with the calling party. An accessible Internet connection may exist when the network device 310 has registered over the Internet 308 with the accessibility server 305. If an accessible Internet connection exists, the web integrated ACD 304 may then query the accessibility server 305 to determine the Internet protocol (IP) address of the connection and ultimately establish an active associated connection between the calling party telephone 300 and the network device 310.

The accessibility of an Internet connection in one embodiment may depend, for example, upon the presence and availability of an Internet connection. According to this embodiment, presence may relate to the presence of the computer 310 being connected to the Internet, while availability relates to the current availability or preference of the user (i.e. the caller). As one skilled in the art will recognize, these fields may be customized to provide alternative accessibility standards.

If there is no accessible Internet connection associated with the calling party, the web integrated ACD 304 may instruct the IVRU 130, according to one embodiment, to send the calling party telephone 300 audio entertainment options such as, for example, music selections, poetry, advertisements, etc.

If there is an Internet connection associated with the calling party, the web integrated ACD 304 may instruct the IVRU 130 and/or the web server 307 to send one or more prompts to the calling party. In one embodiment of the present invention, the calling party may, for example, receive audio prompts, which are transmitted by the IVRU 130 to the calling party telephone 300. In addition, the calling party may also receive visual prompts via a dialogue box, for example, that is transmitted by the web server 307 to the network device 310. These prompts may, for example, first indicate that the EOI is available and then require the calling party to select or decline the EOI.

If the calling party refuses to connect to the FOI, the web integrated ACD 304 may instruct IVRU 130 to send to the calling party telephone 300 audio entertainment options such as, for example, music selections, poetry, advertisements, etc. If the calling party prefers to connect to the EOI, the web integrated ACD 304 may then retrieve, for example, the network device 310 Internet protocol address and send it to the web server 307 to initiate an EOI session. Further, the transmission of the EOI from the web server 307 to the network device 310 may be in addition to or in place of audio entertainment options that are delivered to the calling party telephone 300 from the IVRU 130.

In one embodiment of the present invention, the EOI may be initiated by sending the network device 310 a URL that invites the calling party to select the URL to begin the EOI. In one embodiment, the web server 307 and the network device 310 may, for example, utilize a chat client to facilitate the sending of the URL to the network device 310. Alternatively, the session may be initiated by using push technology to "push" the URL or the first web page of the EOI to the network device 310. Push technology, alternatively known as "webcasting," relies on an application residing on the subscriber's computer 310 to initiate a push session whereby updates are requested by the application at regular intervals set by the user. As one skilled in the art will recognize that many push clients currently exist, and each of these push clients are intended to be included within the present invention.

Once the EOI has been initiated, the web integrated ACD 304 may instruct the web server 307 to send, for example, an EOI web page to the network device 310. The EOI web pages may provide the on-hold caller with a variety of interactive entertainment options such as, for example, on-line games, advertisements, short films, movie trailers, etc. Music videos, relating to the music being played over the calling party telephone 300 while the calling party is on-hold, may also be transmitted to the network device 310.

Once the desired party 312 is available, the web integrated ACD 304 may then instruct the web server 307 to deliver to the calling party computer a visual message such as, for example, a pop-up dialogue box that notifies the calling party that a representative 312 is available to service the call. This visual message may be in addition to or in place of an audio message that the IVRU 130 may deliver to the calling party telephone 300, wherein the audio message also notifies the calling party of the present availability of the service representative 312.

In addition to the aforementioned notification messages, the web integrated ACD 304 may instruct the IVRU 130 to transmit audio prompts to the calling party telephone 300. Likewise, the web integrated ACD 304 may also instruct the web server 307 to deliver visual prompts to the network device 310 such as, for example, a dialogue box. These prompts are capable of receiving caller inputs that provide the calling party with the option of remaining connected to the EOI after the call is transferred from the holding queue to the desired called party 312. After receiving the calling party's response regarding use of the EOI after the call is transferred to the desired party, the web integrated ACD 304 may then connect the calling party telephone 300 to the desired called party or service representative 312 via the PSTN 301.

Figure 6:
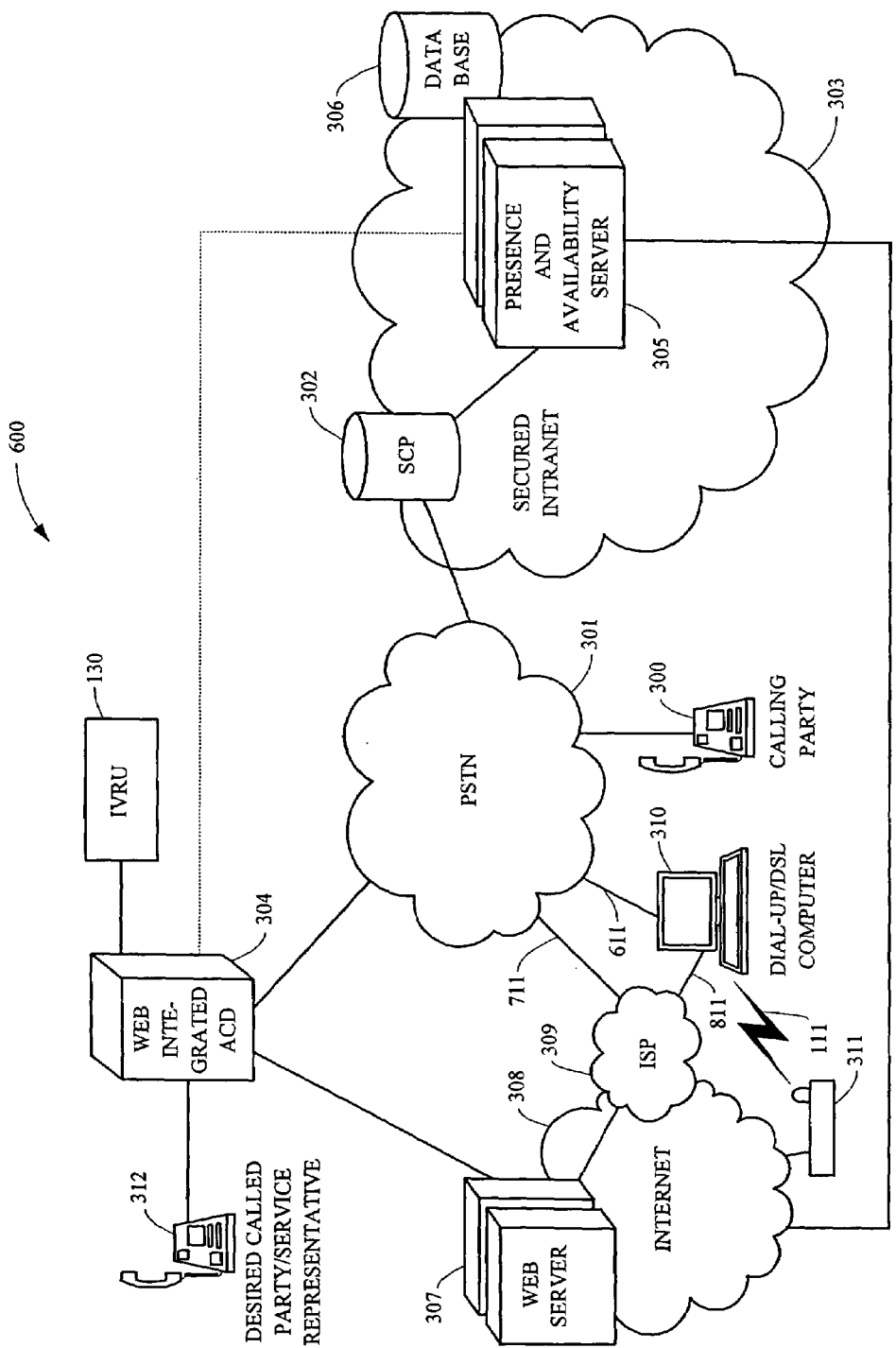
FIG. 6 is a block diagram of a system according to another embodiment of the present invention.

FIG. 6 is a block diagram of a system 600 according to another embodiment of the present invention. According to this embodiment, the calling party telephone 300 is coupled to the PSTN 301, which is coupled to the SCP 302, which resides on a secured intranet 303 and gives handling instructions to the PSTN 301. The secured intranet also includes an accessibility server 305 and an accessibility database 306. The accessibility server is coupled to the Internet 308 and keeps track of the status of a plurality of connections between the Internet 308 and the subscribers' network devices. Although FIG. 6 shows the network device 310 as a computer, in another embodiment of the present invention, the network device 310 may also include a personal digital assistant (PDA), a pager, or any other device capable of receiving and transmitting data between the Internet 308 and the user of the network device 310.

An Internet connection may, for example, be established from the network device 310 through an ISP 309 over the PSTN 301, such as by using a DSL modem or analog modem. However, an Internet connection may also be established in numerous ways, such as, for example, a cable modem, wherein the computer 310 is connected directly to the ISP 309. Further, the computer 310 may also be connected directly to the Internet or can communicate via RF with a base station 311, which is connected to the Internet. There exist numerous other ways to connect to the Internet, each of which is intended to be within the scope of the present invention.

According to one embodiment of the present invention, the PSTN 301 is coupled to a private branch exchange web integrated ACD 304 or a web integrated ACD 304 residing with another telephone service provider. According to this embodiment, the web integrated ACD 304 may be coupled to a web server 307 to provide an EOI to a calling party. In addition, the web integrated ACD 304 and the PSTN 301 may also be coupled to an IVRU 130, which may reside on a private branch exchange or with another telephone service provider.

When the PSTN 301 receives a call for the called party 312, it queries the SCP 302 for subscriber specific handling instructions. The SCP 302 responds by instructing the PSTN 301 to connect the call to the web integrated ACD 304. The web integrated ACD 304 may then send a query to the accessibility server 305 to determine whether there is an accessible Internet connection associated with the calling party. An accessible Internet connection may exist when the network device 310 has registered over the Internet 308 with the accessibility server 305. If an accessible Internet connection exists, the web integrated ACD 304 may then query the accessibility server 305 to determine the Internet protocol (IP) address of the connection and ultimately establish an active associated connection between the calling party telephone 300 and the network device 310.

The accessibility of an Internet connection in one embodiment may depend, for example, upon the presence and availability of an Internet connection. According to this embodiment, presence may relate to the presence of the computer 310 being connected to the Internet, while availability relates to the current availability or preference of the user (i.e. the caller). These fields may be customized to provide alternative accessibility standards.

If there is no accessible Internet connection associated with the calling party, the web integrated ACD 304 may instruct the UVRU 130, according to one embodiment, to send the calling party telephone 300 audio entertainment options such as, for example, music selections, poetry, advertisements, etc.

If there is an Internet connection associated with the calling party, the web integrated ACD 304 may instruct the IVRU 130 and/or the web server 307 to send one or more prompts to the calling party. In one embodiment of the present invention, the calling party may, for example, receive audio prompts, which are transmitted by the IVRU 130 to the calling party telephone 300. In addition, the calling party may also receive visual prompts via a dialogue box, for example, that is transmitted by the web server 307 to the network device 310. These prompts may, for example, first indicate that the EOI is available and then require the calling party to select or decline the EOI.

If the calling party refuses to connect to the EOI, the web integrated ACD 304 may instruct IVRU 130 to send to the calling party telephone 300 audio entertainment options such as, for example, music selections, poetry, advertisements, etc. If the calling party prefers to connect to the EOI, the web integrated ACD 304 may then retrieve, for example, the network device 310 Internet protocol address and send it to the web server 307 to initiate an EOI session. Further, the transmission of the EOI from the web server 307 to the network device 310 may be in addition to or in place of audio entertainment options that are delivered to the calling party telephone 300 from the IVRU 130.

In one embodiment of the present invention, the EOI may be initiated by sending the network device 310 a URL that invites the calling party to select the URL to begin the EOI. In one embodiment, the web server 307 and the network device 310 may, for example, utilize a chat client to facilitate the sending of the URL to the network device 310. Alternatively, the session may be initiated by using push technology to "push" the URL or the first web page of the EOI to the network device 310. Push technology, alternatively known as "webcasting," relies on an application residing on the subscriber's computer 310 to initiate a push session whereby updates are requested by the application at regular intervals set by the user. As one skilled in the art will recognize that many push clients currently exist, and each of these push clients are intended to be included within the present invention.

Once the EOI has been initiated, the web integrated ACD 304 may instruct the web server 307 to send, for example, an EOI web page to the network device 310. The EOI web pages may provide the on-hold caller with a variety of interactive entertainment options such as, for example, on-line games, advertisements, short films, movie trailers, etc. Music videos, relating to the music being played over the calling party telephone 300 while the calling party is on-hold, may also be transmitted to the network device 310.

Once the desired party 312 is available, the web integrated ACD 304 may then instruct the web server 307 to deliver to the calling party computer a visual message such as, for example, a pop-up dialogue box that notifies the calling party that a representative 312 is available to service the call. This visual message may be in addition to or in place of an audio message that the IVRU 130 may deliver to the calling party telephone 300, wherein the audio message also notifies the calling party of the present availability of the service representative 312.

In addition to the aforementioned notification messages, the web integrated ACD 304 may instruct the IVRU 130 to transmit audio prompts to the calling party telephone 300. Likewise, the web integrated ACD 304 may also instruct the web server 307 to deliver visual prompts to the network device 310 such as, for example, a dialogue box. These prompts are capable of receiving caller inputs that provide the calling party with the option of remaining connected to the EOI after the call is transferred from the holding queue to the desired called party 312. After receiving the calling party's response regarding use of the EOI after the call is transferred to the desired party, the web integrated ACD 304 may then connect the calling party telephone 300 to the desired called party or service representative 312 via the PSTN 301.

Figure 7A:
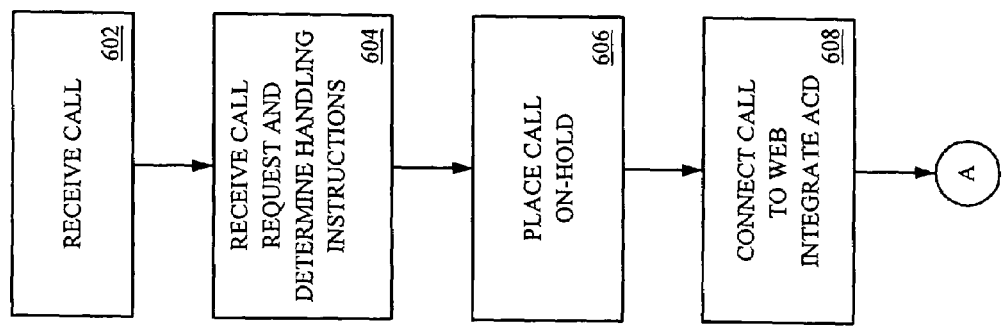
Figure 7B:
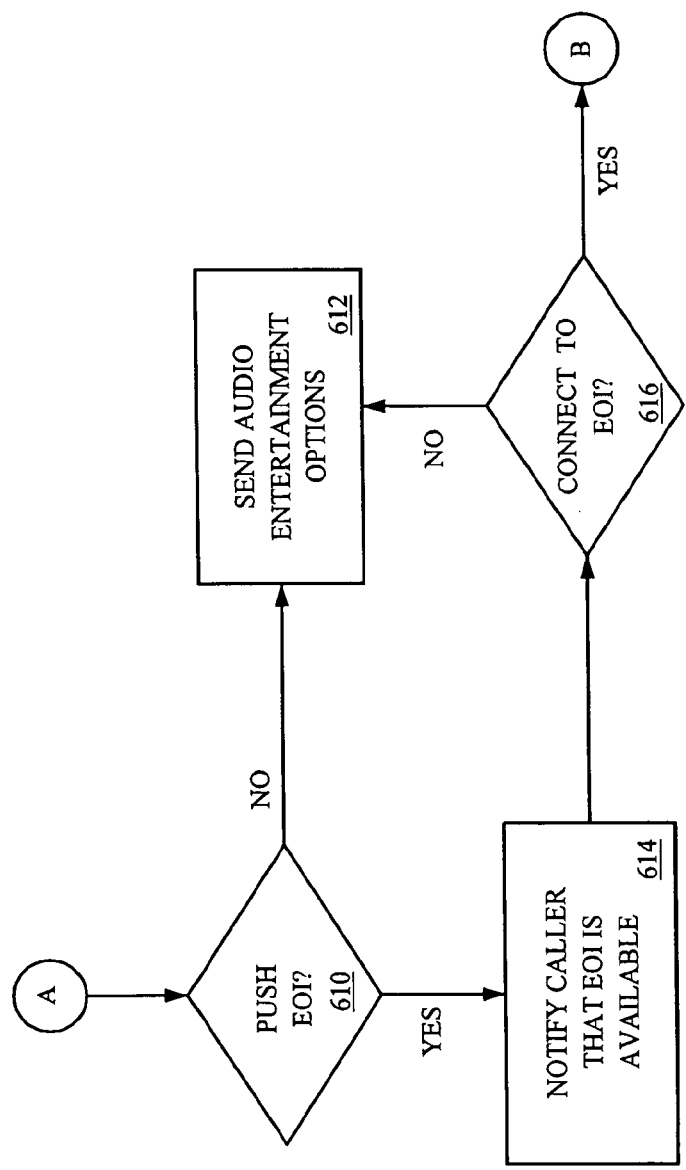

FIGS. 7a, 7b, and 7c are flowcharts illustrating an embodiment of a process performed by the systems shown in FIGS. 5 and 6. At step 602, the calling party places a call to the desired party 312 and the system receives the call. If the called party 312 is unavailable to receive the call, the SSP receives the call request and queries the SCP 302 for handling instructions, as shown by step 604. At step 606, the SCP 302 responds with handling instructions to place the call in a holding queue and, at step 608, the SSP connects the call to the web integrated ACD 304.

At step 610, the web integrated ACD 304 determines if an EOI can be pushed to the calling party. The EOI can be pushed to the calling party if the network device 310 has an accessible Internet connection. The accessibility of the Internet connection depends upon the presence of connections 111, 611, 711, and/or 811 and the availability of the calling party. An accessibility server 305 maintains database 306 including a list of all registered subscribers, such that the web integrated ACD 304 may query the server 305 to find the status of the calling party with respect to Internet connectivity. If the web integrated ACD 304 identifies the Internet address of the network device 310, the calling party is considered to have an active associated connection between the calling party telephone 300 and the network device 310. The accessibility of an Internet connection in this embodiment may be determined according to whether a network device 310 is present on the Internet 308 and whether the user (i.e. the caller) is available at the computer 310. However, in alternative embodiments, the accessibility of an Internet connection may also be made contingent upon a number of other circumstances, including preference of the user.

If no network connections are accessible and/or the calling party is not available, then the EOI cannot be pushed, and as shown by step 612, the IVRU 130 sends audio entertainment options to the on-hold calling party telephone 300 such as, for example, music selections, poetry, advertisements, etc. If an Internet connection is accessible, the EOI can be pushed, and, as shown by step 614, the web integrated ACD 304 instructs the IVRU 130 to send an audio message to the calling party telephone 300 that notifies the calling party that the EOI is available. In addition to the audio notification, the web integrated ACD 304 may also instruct the web server 307 to send to the network device 310 a visual notification that notifies the calling party that the EOI is available. This visual notification may be, for example, a pop-up dialogue box.

In addition to the aforementioned notification messages, the web integrated ACD 304 may instruct the IVRU 130 to transmit audio prompts to the calling party telephone 300. Likewise, the web integrated ACD 304 may also instruct the web server 307 to deliver visual prompts to the network device 310, which may include but are not limited to dialogue boxes. These prompts are capable of receiving caller inputs that provide the calling party with the option of connecting to the EOI, as shown by step 616. If the calling party refuses to connect to the EOI, the IVRU 130 sends, at step 612, audio entertainment options to the on-hold calling party telephone 300, such as, for example, music selections, poetry, advertisements, etc.

If the calling party answers affirmatively to connecting to EOI, the web integrated ACD 304 then retrieves web interface information, as shown by step 618. This information may include, for example, the network address of the calling party, a customized menu system for the specific calling party, and any other information that might be useful in facilitating interaction with the calling party. As shown by step 620, the web integrated ACD 304 then instructs the web server 307 to push the EOI to the network device 310.

Once the desired party 312 is available to service the call, the web integrated ACD 304 may then instruct the IVRU 130 to deliver an audio message to the telephone 300 that notifies the calling party that the called party 312 is available. In addition, the web integrated ACD 304 may instruct the web server 307 to deliver to the computer 310 a pop-up dialogue box, for example, that also notifies the calling party that the called party 312 is available to service the call, as shown by step 622.

At step 624, the web integrated ACD 304 may instruct the UVRU 130 to deliver an audio prompt to the telephone 300 that asks the calling party if he or she would like to remain connected to the EOI after the call is transferred from the holding queue to the called party 312. In addition, the web integrated ACD 304 may also instruct the web server 307 to deliver to the computer 310 a visual prompt such as, for example, a pop-up dialogue box. These prompts are capable of receiving caller inputs that identify if the calling party would like to remain connected to the EOI after the call is transferred from the holding queue to the called party 312.

If the calling party refuses to remain connected to the EOI, the EOI session on the network device 310 is ended, as shown by step 626. However, if the calling party decides to remain connected to the EOI after being transferred from the holding queue to the called party, the web integrated ACD 304 may instruct the web server 307 to continue to transmit the EOI to the network device 310, as shown by step 628. After receiving the calling party's responses concerning the EOI, the web integrated ACD 304 may then connect the call to the desired called party or service representative 312 at step 630.

The various methods described hereinabove may be implemented on any type of suitable computer hardware, computer software, or combinations thereof. For example, the methods may be implemented in computer software using any suitable computer software language type such as, for example, C or C++ using, for example, conventional or object-oriented techniques. Such software may be stored on any type of suitable computer-readable medium or media such as, for example, a magnetic or optical storage medium.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. An on-hold interface system, comprising:
    an interactive voice response system for providing a plurality of audio signals to a telecommunications device of a calling party, wherein the calling party has been placed on-hold and wherein the telecommunications device of the calling party has a telephone number associated therewith;
    a server for checking accessibility of a network connection of a network device that has a corresponding network address and is associated with the calling party in addition to the telecommunications device;
    a webserver hosting an enhanced on-hold interface and providing a further plurality of signals representing the enhanced on-hold interface to the network device; and
    an automatic call distributor for receiving a signal indicating the accessibility of the network connection of the network device, for mapping the telephone number of the telecommunications device to the network address of the network device, for instructing the webserver to provide the further plurality of signals representing the enhanced on-hold interface to the network device via the network address, and for instructing the interactive voice response system to provide the plurality of signals to the telecommunications device.

2. The system of claim 1, wherein the telecommunications device is one of a wireless device and a wireline device.

3. The system of claim 1, wherein the telecommunications device is one of a wireless telephone, a personal digital assistant (PDA), telecopier, pager, and a standard plain-old telephone service (POTS) telephone.

4. The system of claim 1, wherein the network device is a device for receiving and transmitting data between a network and a user of the network device.

5. The system of claim 1, wherein the network device is one of a computer, a personal digital assistant (PDA), and a pager.

6. The system of claim 1, wherein the accessibility of the network connection depends upon the presence and availability of the network device connected to the network.

7. The system of claim 1, wherein the automatic call distributor receives the accessibility information signal from a signal control point through a signaling network on a public switched telephone network.

8. The system of claim 1, wherein the automatic call distributor receives the accessibility information signal from the server.

9. The system of claim 8, wherein the accessibility information signal includes a network address of the network device associated with the calling party.

10. The system of claim 1, wherein the automatic call distributor includes a service node.

11. The system of claim 1, wherein the web server is configured to receive instructions and to send an enhanced on-hold interface when the network connection is available.

12. The system of claim 11, wherein the enhanced on-hold interface is configured to transmit at least one of audio, video, graphics, and text files to the network device.

13. The system of claim 11, wherein the web server uses a push client residing on the network device to push the enhanced on-hold interface to the network device.

14. The system of claim 11, wherein the web server uses a chat client residing on a network device to send a universal resource locator to the network device.

15. The system of claim 1, wherein the plurality of audio signals sent from the interactive voice response system correspond to the plurality of signals being sent from the enhanced on-hold interface system.

16. The system of claim 1, wherein at least one of the automatic call distributor and the on-hold interface system resides on a telephone service provider network.

17. The system of claim 1, wherein at least one of the automatic call distributor and the on-hold interface system resides on a private branch exchange.

18. The system of claim 1, wherein the automatic call distributor is configured to instruct the enhanced on-hold interface system to send at least one message and prompt to the network device.

19. The system of claim 18, wherein the message is for notifying the calling party That a called party is available.

20. The system of claim 18, wherein the message is for notifying the calling party that an enhanced on-hold interface is available.

21. The system of claim 18, wherein the prompt is configured to receive an input identifying the preference of the calling party to connect to the enhanced on-hold interface.

22. The system of claim 1, wherein the automatic call distributor is configured to instruct the interactive voice response system to send at least one message and prompt to the telecommunications device.

23. The system of claim 22, wherein the message is for notifying the calling party that a called party is available.

24. The system of claim 22, wherein the message is for notifying the calling party that an enhanced on-hold interface is available.

25. The system of claim 22, wherein the prompt is configured to receive an input identifying the preference of the calling party to connect to the enhanced on-hold interface.

26. The system of claim 25, wherein the interactive voice response system comprises voice recognition logic operable to recognize a voice input from the calling party.

27. The system of claim 25, wherein the interactive voice response system comprises touchtone recognition logic operable to recognize a DTMF input from the calling party.

28. The system of claim 1, wherein the server stores and updates a list of calling parties with available network connections.

29. The system of claim 1, wherein the server stores and updates a list of calling parties present at the network device with an available network connection.

30. The system of claim 1, wherein the automatic call distributor is configured to route a call from the calling party to the next available representative of a called party.

31. A method for providing at least first and second content to a calling party placed on-hold, the method comprising:

receiving a call from a telecommunications device of the calling party, the calling party having a calling telephone number;

checking an accessibility server for a network connection of a network device, wherein the network device is associated with the calling party, in addition to the telecommunications device;

mapping the calling telephone number associated with the telecommunications device to a network address associated with the network device;

sending at least one message and prompt to at least one of the network device and the telecommunications device upon finding the network connection;

receiving at least one response from the calling party;

providing the first content to the network device via the network address; and providing the second content to the telecommunications device based on the accessibility of the network connection and the response of the calling party.

32. The method of claim 31, wherein checking the accessibility server for the network connection of the network device includes retrieving a network address corresponding to the accessible network connection of the network device.

33. The method of claim 31, wherein checking the accessibility server for the network connection of the network device includes querying a presence database to determine if the network device associated with the telecommunications device of the calling party is registered on the network.

34. The method of claim 31, wherein checking the accessibility server for the network connection of the network device includes querying an availability database to determine if the calling party is available at the network device.

35. The method of claim 31, wherein providing the first content includes using a web server to send at least one of audio, video, graphics, and text files to the network device.

36. The method of claim 35, further comprising pushing an enhanced on-hold interface using a push client residing on the network device associated with the telecommunications device of the calling party.

37. The method of claim 35, further comprising transmitting an enhanced on-hold interface by sending a universal resource locator to a chat client located on the network device associated with The telecommunications device of the calling party.

38. The method of claim 31, wherein providing the first content includes sending a message, wherein The message is for notifying the calling party of the availability status of a called party.

39. The method of claim 31, wherein providing the second content includes sending a prompt, wherein the prompt is configured to receive an input identifying the preference of the calling party to connect to an enhanced on-hold interface.

40. The method of claim 31, further comprising routing a call from the calling party to a next available representative of a called party.

41. An apparatus, comprising:
- means for receiving a call from a telecommunications device of a calling party having a telephone number;
- means for checking an accessibility server for a network connection of a network device, wherein the network device has a network address and is associated with the calling party, in addition to the telecommunications device;
- means for mapping the telephone number associated with the telecommunications device to the network address of the network device;
- means for sending at least one message and prompt to at least one of the network device and the telecommunications device upon finding the network connection;
- means for receiving at least one response from the calling party;
- means for providing first content to the network device; and
- means for providing at least further content to the telecommunications device based the accessibility of the network connection and the response of the calling party.

42. A computer readable medium having stored thereon instructions which, when executed by a processor, cause the processor to:

- receive a call from a telecommunications device of a calling party having a telephone number;
- check an accessibility server for a network connection of a network device, wherein the network device has a network address and is associated with the calling party, in addition to the telecommunications device;
- map the telephone number associated with the telecommunications device to the network address of the network device;
- send at least one message and prompt to at least one of the network device and the telecommunications device upon finding the network connection;
- receive at least one response from the calling party;
- provide first content to the network device; and
- provide at least farther content to the tetecommunications device based the accessibility of the network connection and the response of the calling party.

* * * * *